(12) United States Patent
Ke

(10) Patent No.: US 7,869,149 B2
(45) Date of Patent: Jan. 11, 2011

(54) LENS MODULE WITH MAGNETIC FIELD BARRIER

(75) Inventor: Chau-Yuan Ke, Tu-Cheng (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 101 days.

(21) Appl. No.: 12/472,291

(22) Filed: May 26, 2009

(65) Prior Publication Data
US 2010/0033853 A1 Feb. 11, 2010

(30) Foreign Application Priority Data
Aug. 5, 2008 (CN) .......................... 2008 1 0303384

(51) Int. Cl.
*G02B 7/02* (2006.01)

(52) U.S. Cl. .................................................... 359/824

(58) Field of Classification Search .......... 359/822–824
See application file for complete search history.

(56) References Cited

U.S. PATENT DOCUMENTS

2006/0061891 A1* 3/2006 Ito et al. ..................... 359/824

\* cited by examiner

*Primary Examiner*—Alicia M Harrington
(74) *Attorney, Agent, or Firm*—Raymond J. Chew

(57) ABSTRACT

An exemplary lens module includes an electromagnetic shutter, an electromagnetic motor and a magnetic field barrier sandwiched between the electromagnetic shutter and the electromagnetic motor. The electromagnetic shutter is configured for generating a first magnetic field. The electromagnetic motor is configured for generating a second magnetic field. The magnetic field barrier is configured for preventing the first magnetic field and the second magnetic field from penetrating therethrough.

18 Claims, 7 Drawing Sheets

LENS MODULE WITH MAGNETIC FIELD BARRIER

BACKGROUND

1. Technical Field

The present invention relates to imaging technology, and more particularly to a lens module.

2. Description of Related Art

Nowadays, lens modules have been widely used in various portable electronic devices. Typically, a lens module includes an electromagnetic shutter and an electromagnetic motor. Generally, each of the electromagnetic shutter and the electromagnetic motor includes a permanent magnet. Hence, the electromagnetic shutter generates a first magnetic field, while the electromagnetic motor generates a second magnetic field. The first magnetic field may interfere and cause the electromagnetic motor work inaccurately. Likewise, the second magnetic field may interfere and cause the electromagnetic shutter work inaccurately.

Therefore, a new lens module is desired to overcome the above mentioned problems.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the present embodiments. Moreover, in the drawings, like reference numerals designate corresponding parts throughout the several views.

DETAILED DESCRIPTION

Embodiments will now be described in detail below with reference to the drawings.

Figure 1:
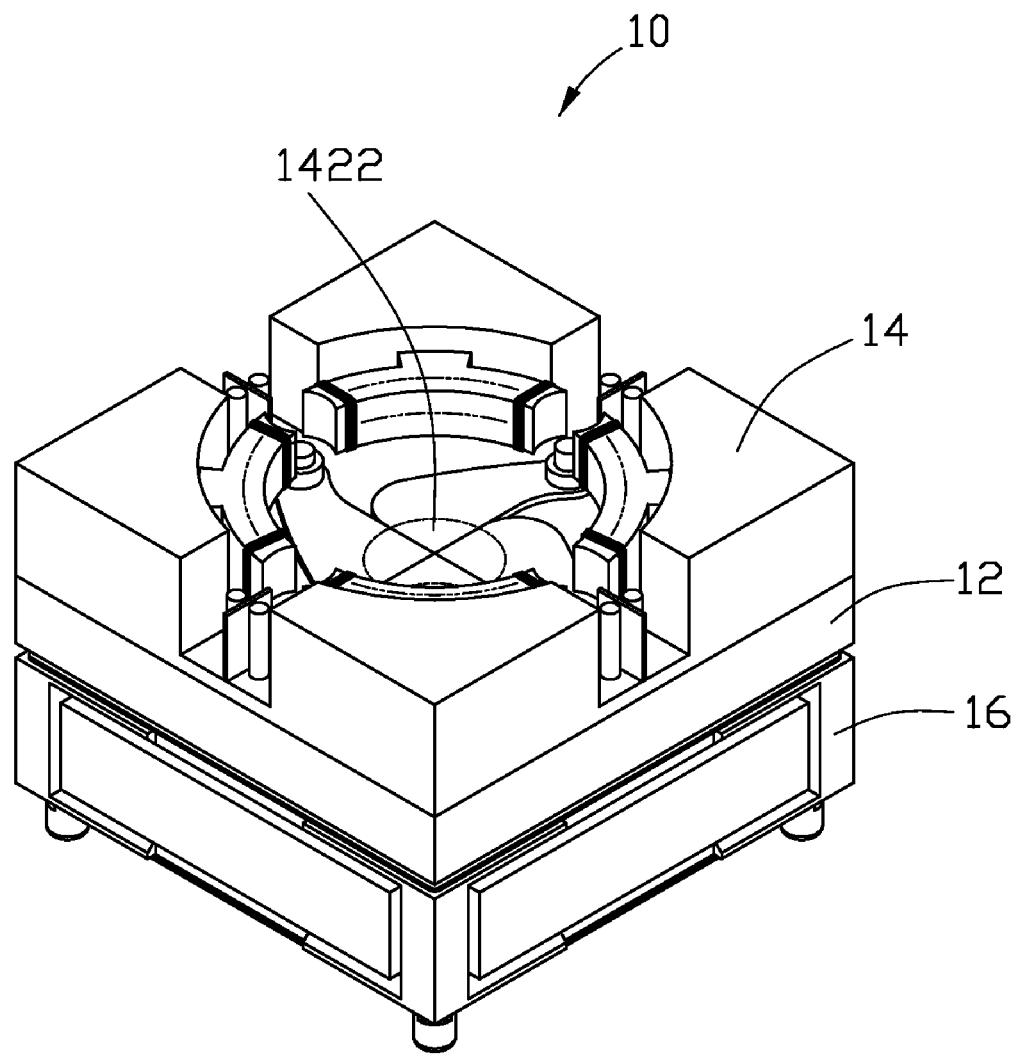
FIG. 1 is an assembled, isometric view of a camera module in accordance with a first embodiment.
Figure 2:
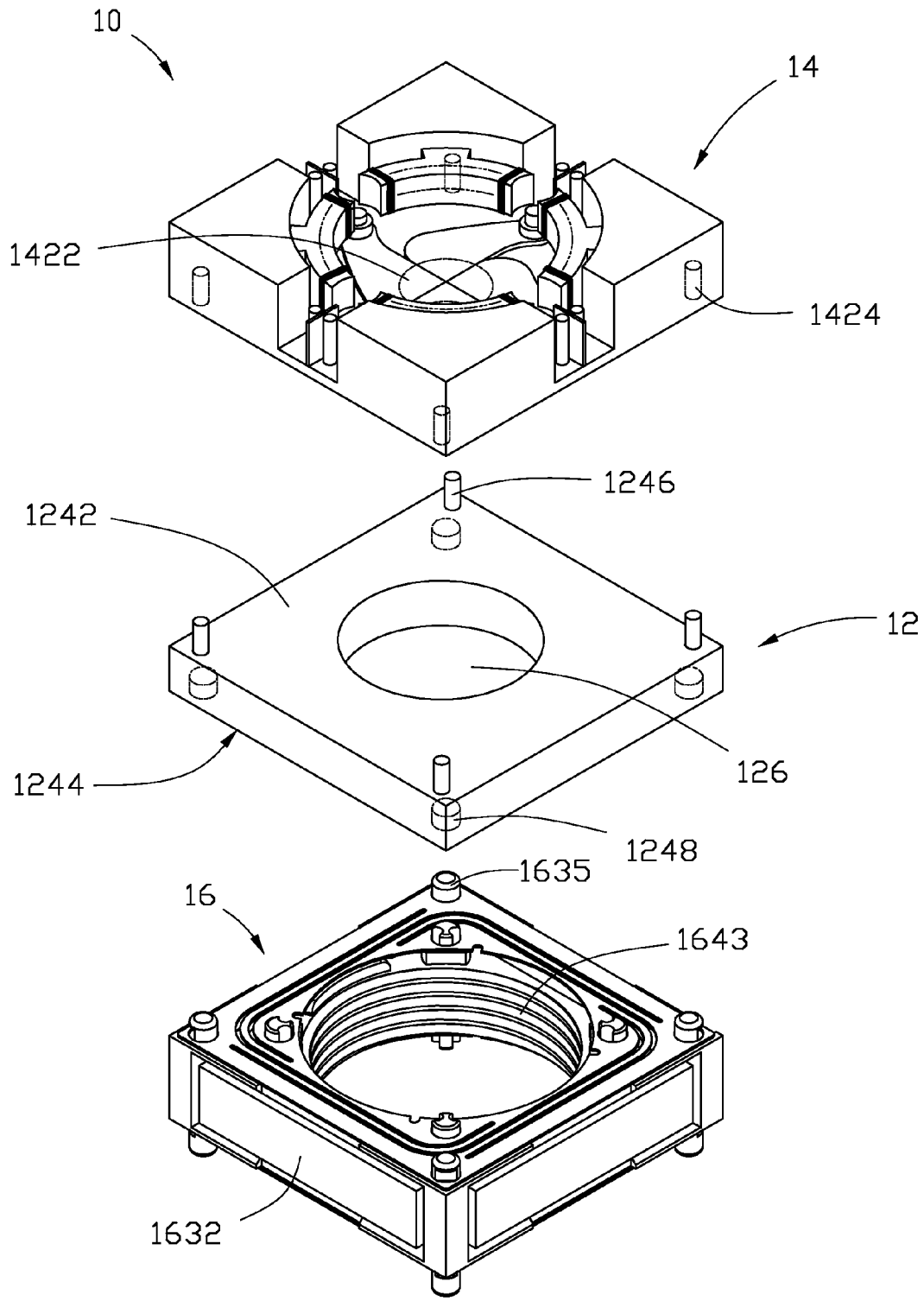
FIG. 2 is an exploded, isometric view of the camera module of FIG. 1.

Referring to FIGS. 1-2, a camera module 10 according to a first embodiment is shown. The camera module 10 includes an electromagnetic shutter 14, an electromagnetic motor 16 and a magnetic field barrier 12. The magnetic field barrier 12 is between the electromagnetic shutter 14 and the electromagnetic motor 16.

The electromagnetic shutter 14 includes an adjustable opening 1422 and a plurality of holes 1424 defined therein. The holes 1424 are configured for coupling with the magnetic field barrier 12. The electromagnetic shutter 14 allows light to pass through the adjustable opening 1422 for a predetermined period of time. Since the electromagnetic shutter 14 includes at least one magnet (e.g., permanent magnet; not labeled), the electromagnetic shutter 14 generates a first magnetic field.

The magnetic field barrier 12 is a plate with a through hole 126 defined therein. The through hole 126 allows light to pass therethrough. The magnetic field barrier 12 includes a first surface 1242, an opposite second surface 1244, a plurality of columns 1246 formed on the first surface 1242, and a plurality of holes 1248 defined in the second surface 1244. The columns 1246 are configured for coupling with holes 1424 of the electromagnetic shutter 14. It should be noted that the magnetic field barrier 12 can be coupled to the electromagnetic shutter 14 via other mechanical means, such as screws, adhesive, and etc. The magnetic field barrier 12 can be made of magnetic conductor material, e.g., nickel and iron alloy, steel.

The electromagnetic motor 16 is configured for coupling with a lens barrel (not shown) of the camera module 10 and driving the lens barrel to move along an optical axis of the lens barrel. The electromagnetic motor 16 includes a plurality of rods 1635 for inserting into the holes 1248 of the magnetic field barrier 12, a plurality of screw threads 1643 formed on an inner surface thereof, and a plurality of permanent magnets 1632. The screw threads 1643 are configured for threadedly coupling to the lens barrel. Since the electromagnetic motor 16 includes permanent magnets 1632, the electromagnetic motor 16 generates a second magnetic field. It should be noted that the electromagnetic motor 16 can be coupled to the magnetic field barrier 12 via other mechanical means, such as screws, adhesive, and etc.

The magnetic field barrier 12 is configured for preventing the first magnetic field and the second magnetic field from interfering with each other. Hence, the magnetic field barrier 12 shields the first magnetic field from the electromagnetic motor 16, and shields the second magnetic field from the electromagnetic shutter 14. Accordingly, the electromagnetic shutter 14 is free of the disturbance of the second magnetic field, and accordingly, works more accurately. Similarly, the electromagnetic motor 16 can work more accurately.

Figure 3:
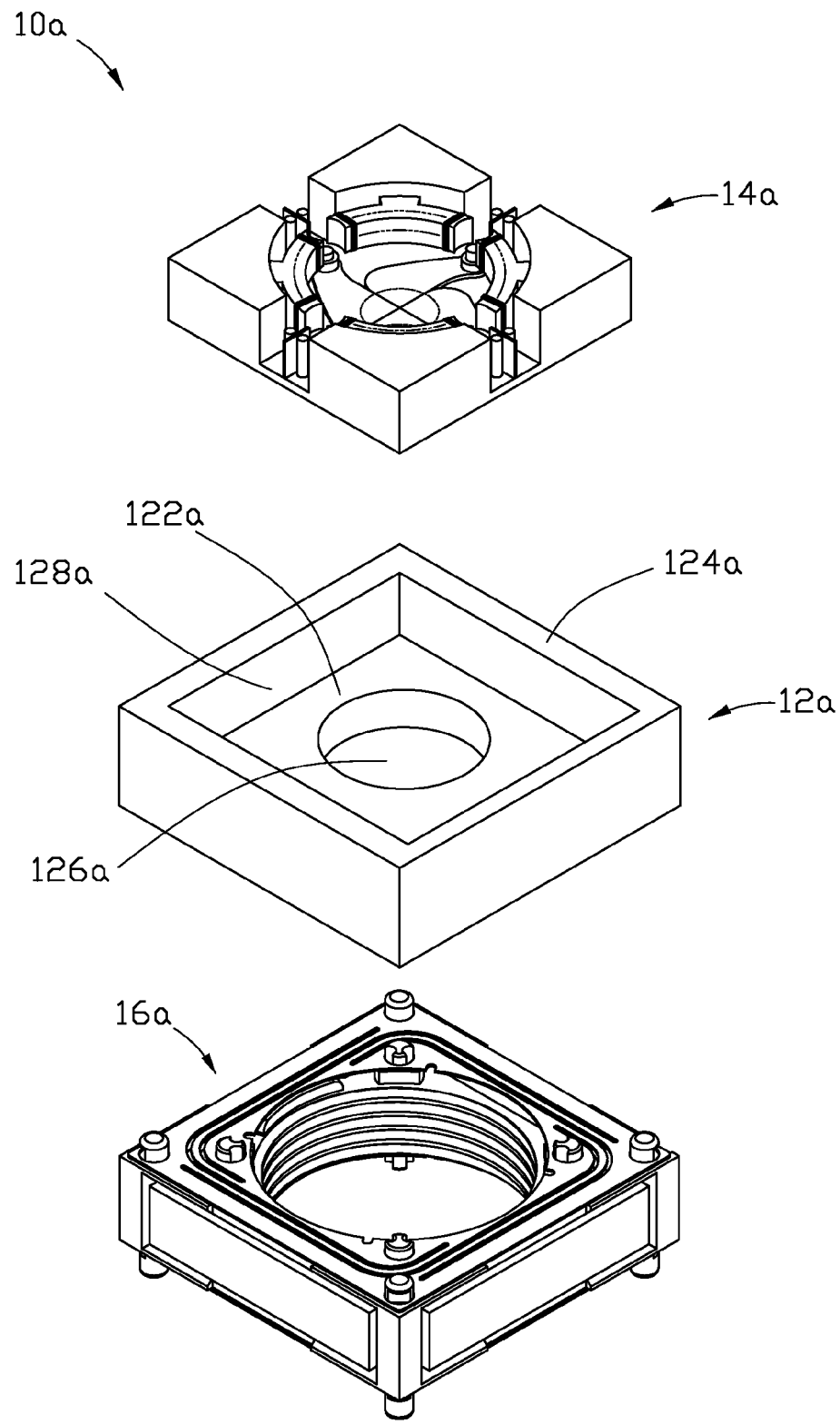
FIG. 3 is an exploded, isometric view of a camera module in accordance with a second embodiment.

Referring to FIG. 3, a camera module 10a according to a second embodiment is shown. The camera module 10a includes an electromagnetic shutter 14a, a magnetic field barrier 12a, and an electromagnetic motor 16a. The magnetic field barrier 12a includes a bottom plate 122a, a through hole 126a defined in the bottom plate 122a, and an enclosed sidewall 124a extending substantially perpendicular to a surface of the bottom plate 122a. The bottom plate 122a and the sidewall 124a cooperatively define a receiving space 128a therein. The electromagnetic shutter 14a is received in the receiving space 128a. The magnetic field barrier 12a can block the magnetic field better than the magnetic field barrier 12 of the first embodiment, as shown in FIGS. 1-2.

Figure 4:
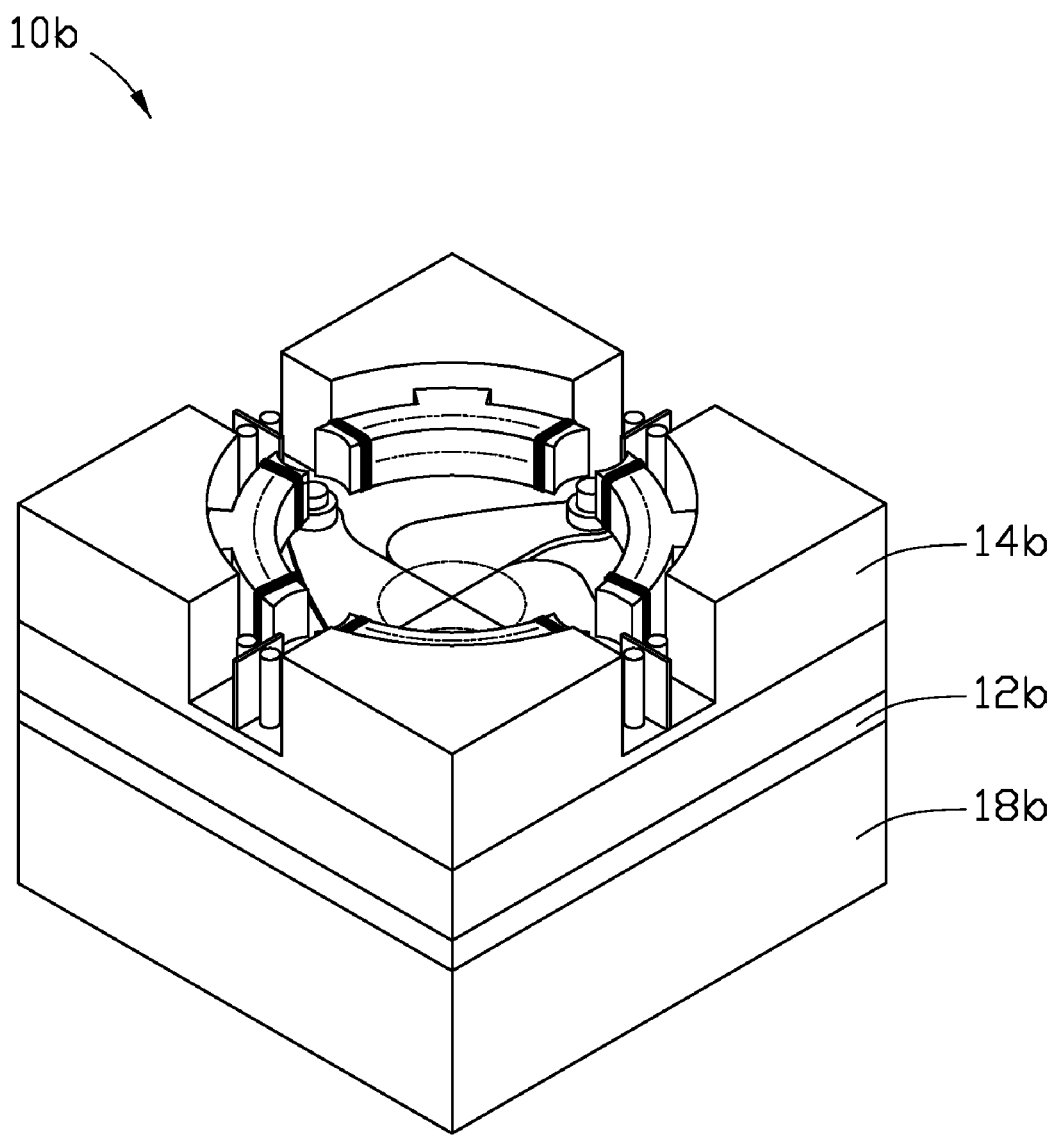
FIG. 4 is an assembled, isometric view of a camera module in accordance with a third embodiment.
Figure 5:
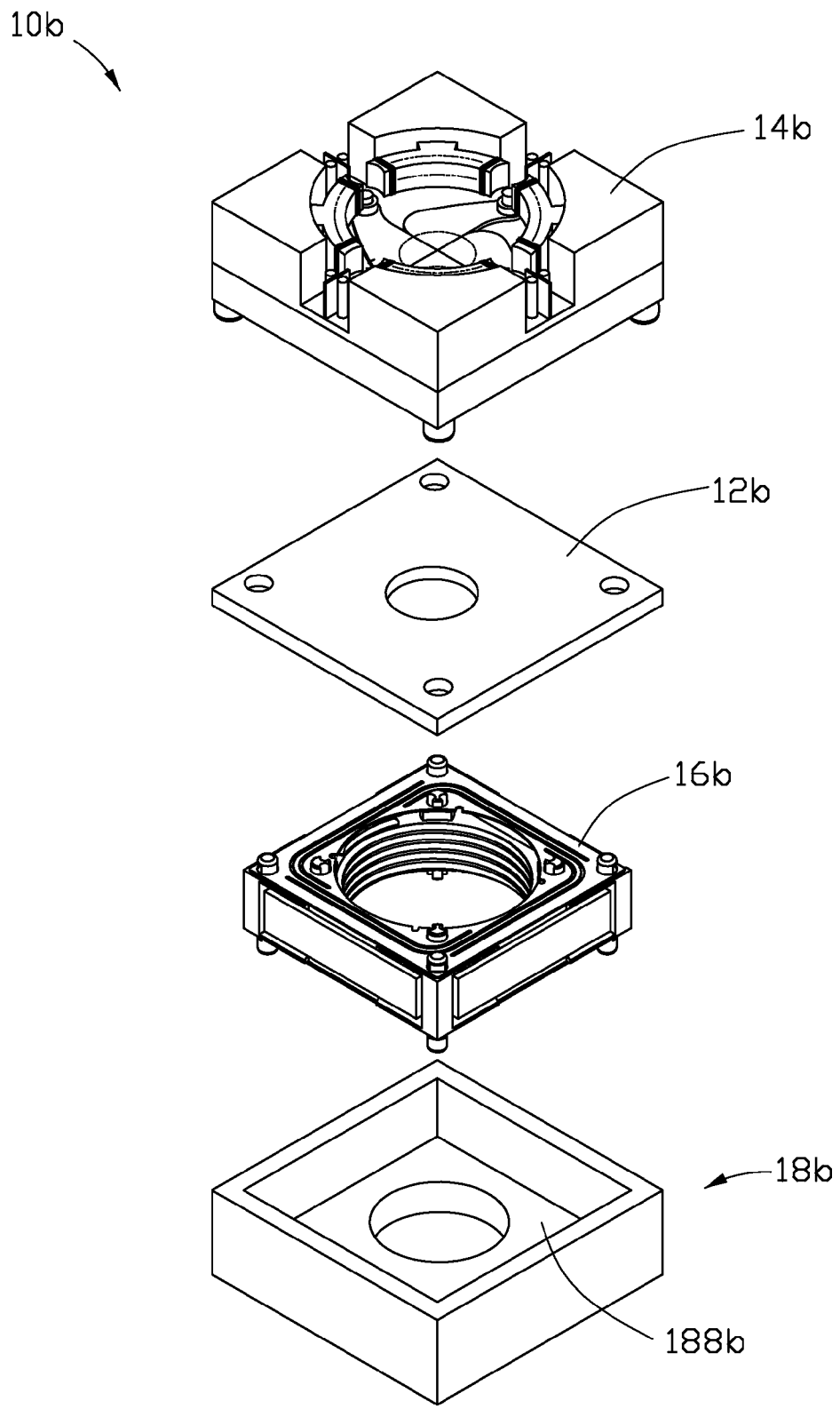
FIG. 5 is an exploded, isometric view of the camera module of FIG. 4.

Referring to FIGS. 4-5, a camera module 10b according to a third embodiment is shown. The camera module 10b includes an electromagnetic shutter 14b, a first magnetic field barrier 12b, a second magnetic field barrier 18b, and an electromagnetic motor 16b. The first magnetic field barrier 12b is similar to the magnetic field barrier 12 of the first embodiment, as shown in FIGS. 1-2, and the second magnetic field barrier 18b is similar to magnetic field barrier 12a of the second embodiment, as shown in FIG. 3. The first magnetic field barrier 12b and the second magnetic field barrier 18b cooperatively define a chamber 188b for receiving the electromagnetic motor 16b. A combination of the first and the second magnetic field barrier 12b, 18b can block the magnetic field better than the magnetic field barrier 12b of the second embodiment, as shown in FIG. 3.

Figure 6:
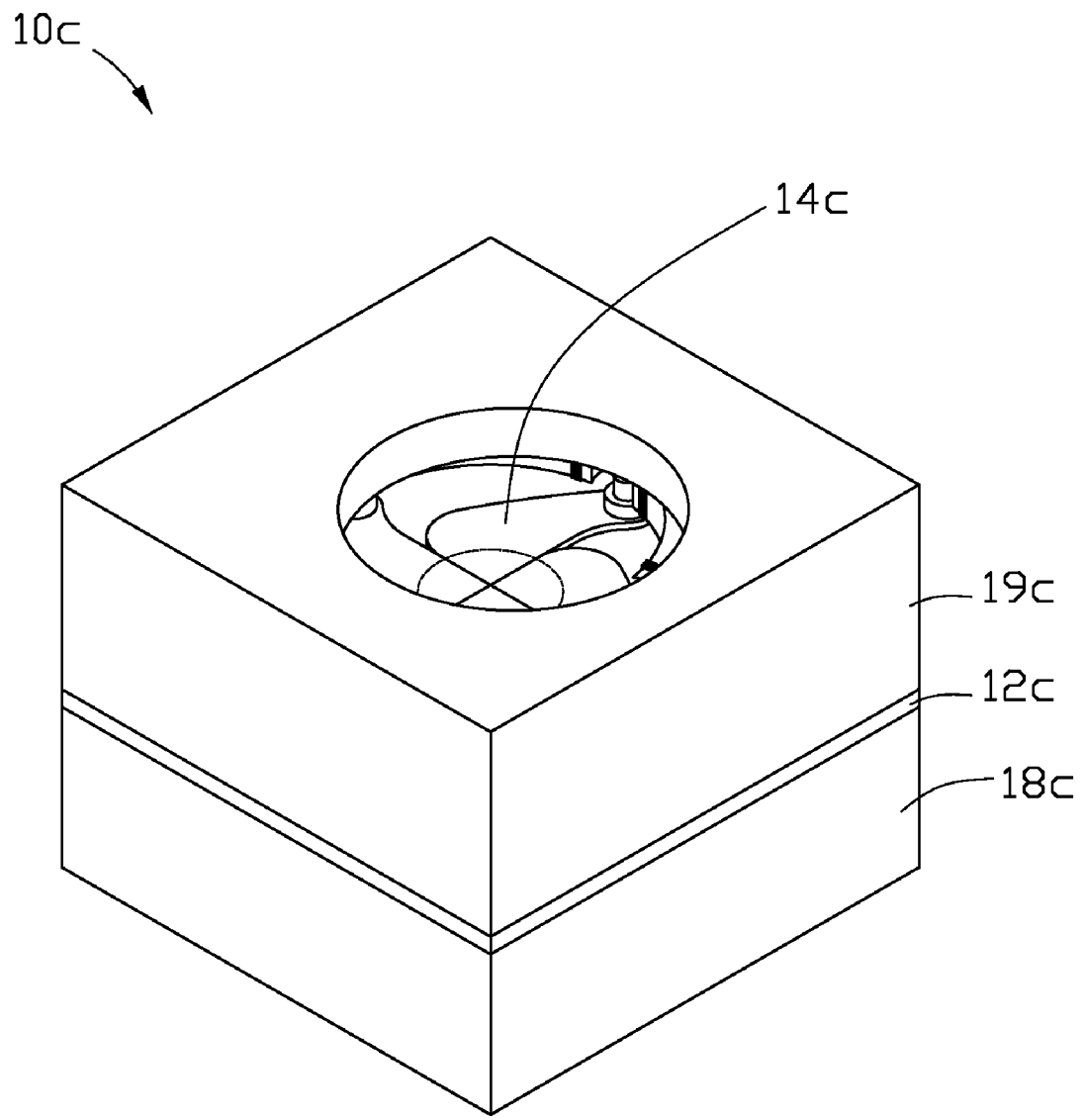
FIG. 6 is an assembled, isometric view of a camera module in accordance with a fourth embodiment.
Figure 7:
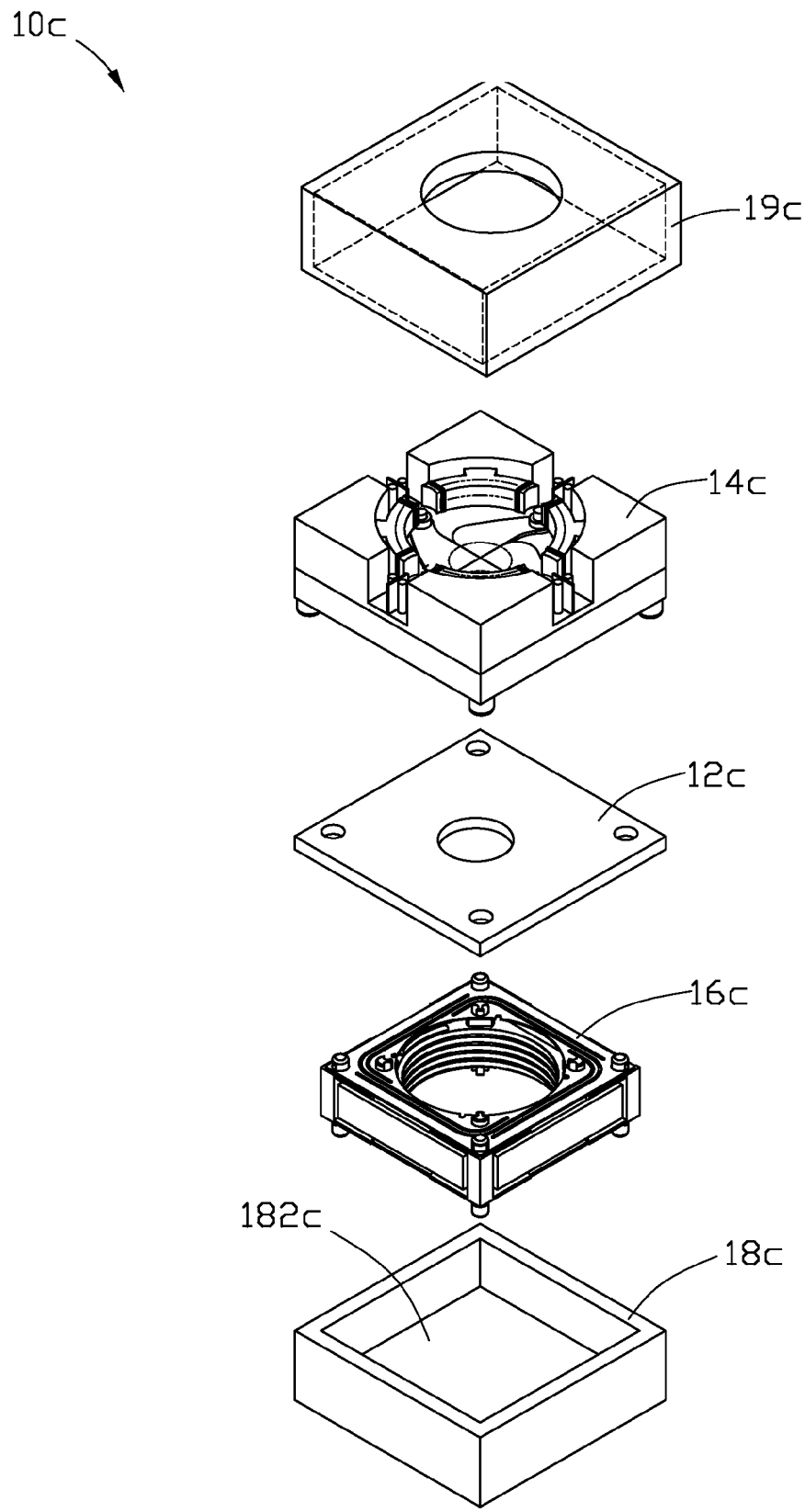
FIG. 7 is an exploded, isometric view of the camera module of FIG. 6.

Referring to FIGS. 6-7, a camera module 10c according to a fourth embodiment is shown. The camera module 10c includes an electromagnetic shutter 14c, a first magnetic field barrier 12c, a second magnetic field barrier 18c, a third magnetic field barrier 19c, and an electromagnetic motor 16c. The first magnetic field barrier 12c is similar to the magnetic field barrier 12 of the first embodiment, as shown in FIGS. 1-2, and the second magnetic field barrier 18c and the third magnetic field barrier 19c are similar to magnetic field barrier 12a of the second embodiment, as shown in FIG. 3. The first magnetic field barrier 12c and the second magnetic field barrier 18c cooperatively define a first chamber 182c for receiving the electromagnetic motor 16c, and the first magnetic field barrier 12c and the third magnetic field barrier 19c cooperatively define a second chamber 198c for receiving the electromagnetic shutter 14c. A combination of the first, the second, and the third magnetic field barrier 12c, 18c, 19c can block the magnetic field better than the combination of the first and the second magnetic field barrier 12b, 18b, as shown in FIGS. 4-5.

While certain embodiments have been described and exemplified above, various other embodiments from the foregoing disclosure will be apparent to those skilled in the art. The present invention is not limited to the particular embodiments described and exemplified but is capable of considerable variation and modification without departure from the scope of the appended claims.

What is claimed is:

1. A lens module comprising:
    an electromagnetic shutter configured for generating a first magnetic field;
    an electromagnetic motor configured for generating a second magnetic field; and
    a magnetic field barrier sandwiched between the electromagnetic shutter and the electromagnetic motor, the magnetic field barrier being configured for preventing the first magnetic field and the second magnetic field from penetrating therethrough.

2. The lens module of claim 1, wherein the magnetic field barrier is made of magnetic conductive material.

3. The lens module of claim 2, wherein the magnetic field barrier further comprises an enclosed sidewall extending from the plate, and the electromagnetic shutter is enclosed by the sidewall.

4. The lens module of claim 3, further comprising an additional magnetic field barrier, wherein the additional magnetic field barrier and the magnetic filed barrier cooperatively define a receiving space therebetween, and the electromagnetic shutter is received in the receiving space.

5. The lens module of claim 2, wherein the magnetic field barrier further comprises an enclosed sidewall extending from the plate, and the electromagnetic motor is enclosed by the sidewall.

6. The lens module of claim 5, further comprising another magnetic field barrier, wherein the another magnetic field barrier and the magnetic filed barrier cooperatively define a receiving space therebetween, and the electromagnetic motor is received in the receiving space.

7. The lens module of claim 1, wherein the magnetic conductor material is selected from the group consisting of nickel and iron alloy, and steel.

8. The lens module of claim 1, wherein the magnetic field barrier is a plate with a through hole defined therein, and the through hole is configured for allowing light to pass therethrough.

9. The lens module of claim 1, further comprising a first magnetic field barrier and a second magnetic field barrier, the first magnetic field barrier comprising a first bottom plate and a first enclosed sidewall extending from the first bottom plate, the second magnetic field barrier comprising a second bottom plate and a second enclosed sidewall extending from the second bottom plate, the first magnetic field barrier and the magnetic field barrier cooperatively define a first receiving space therebetween, the electromagnetic shutter being received in the first receiving space, the second magnetic field barrier and the magnetic field barrier cooperatively define a second receiving space therebetween, the electromagnetic motor being received in the second receiving space.

10. A lens module comprising:
    an electromagnetic shutter configured for generating a first magnetic field;
    an electromagnetic motor configured for generating a second magnetic field; and
    a magnetic field barrier sandwiched between the electromagnetic shutter and the electromagnetic motor, the magnetic field barrier being made of magnetic conductive material.

11. The lens module of claim 10, wherein the magnetic conductor material is selected from the group consisting of nickel, iron alloy, and steel.

12. The lens module of claim 10, wherein the magnetic field barrier is a plate with a through hole defined therein, and the through hole is configured for allowing light to pass therethrough.

13. The lens module of claim 12, wherein the magnetic field barrier further comprises an enclosed sidewall extending from the plate, and the electromagnetic shutter is enclosed by the sidewall.

14. The lens module of claim 13, further comprising an additional magnetic field barrier, wherein the additional magnetic field barrier and the magnetic filed barrier cooperatively define a receiving space therebetween, and the electromagnetic shutter is received in the receiving space.

15. The lens module of claim 12, wherein the magnetic field barrier further comprises an enclosed sidewall extending from the plate, and the electromagnetic motor is enclosed by the sidewall.

16. The lens module of claim 15, further comprising another magnetic field barrier, wherein the another magnetic field barrier and the magnetic filed barrier cooperatively define a receiving space therebetween, and the electromagnetic motor is received in the receiving space.

17. The lens module of claim 10, further comprising a first magnetic field barrier and a second magnetic field barrier, the first magnetic field barrier comprising a first bottom plate and a first enclosed sidewall extending from the first bottom plate, the second magnetic field barrier comprising a second bottom plate and a second enclosed sidewall extending from the second bottom plate, the first magnetic field barrier and the magnetic field barrier cooperatively define a first receiving space therebetween, the electromagnetic shutter being received in the first receiving space, the second magnetic field barrier and the magnetic field barrier cooperatively define a second receiving space therebetween, the electromagnetic motor being received in the second receiving space.

18. A lens module comprising:
    an electromagnetic shutter configured for generating a first magnetic field;
    an electromagnetic motor configured for generating a second magnetic field; and
    a magnetic field barrier sandwiched between the electromagnetic shutter and the electromagnetic motor, the magnetic field barrier being configured for shielding the first magnetic field from the electromagnetic motor, and shielding the second magnetic field from the electromagnetic shutter.

* * * * *